United States Patent [19]
Musschoot

[11] Patent Number: 6,029,796
[45] Date of Patent: Feb. 29, 2000

[54] TWO WAY VIBRATORY CONVEYOR

[75] Inventor: Albert Musschoot, Barrington, Ill.

[73] Assignee: General Kinematics Corporation, Barrington, Ill.

[21] Appl. No.: 08/918,865

[22] Filed: Aug. 26, 1997

[51] Int. Cl.[7] ................................................. B65G 27/32
[52] U.S. Cl. ........................... 198/753; 198/763; 198/770
[58] Field of Search .................................... 198/753, 763, 198/770

[56] References Cited

U.S. PATENT DOCUMENTS

| | | | |
|---|---|---|---|
| 2,941,658 | 6/1960 | Sherwen | 198/753 |
| 3,145,831 | 8/1964 | Röder et al. | 198/753 |
| 3,746,149 | 7/1973 | Shrader | 198/753 |
| 4,754,870 | 7/1988 | Hallman | 198/750 |

*Primary Examiner*—Joseph E. Valenza
*Attorney, Agent, or Firm*—Wood, Phillips, VanSanten, Clark & Mortimer

[57] ABSTRACT

Drive motor size and energy costs are reduced in a bidirectional vibratory conveyor that includes a bed (10) with an elongated generally horizontal conveying surface (16) terminating an opposite ends (12, 14). Isolation springs (26) mount the bed (10) above the underlying terrain (32) and a vibration inducing assembly (40) that includes a rotatable shaft (56) and an eccentrically mounted weight (58) is mounted to the bed (10). A pair of generally horizontally acting, vibration amplification systems (72) are mounted on the bed (10) and sandwich the vibration inducing assembly (40). Conveying direction can be reversed simply by reversing the direction of rotation of the motor shaft (56).

7 Claims, 1 Drawing Sheet

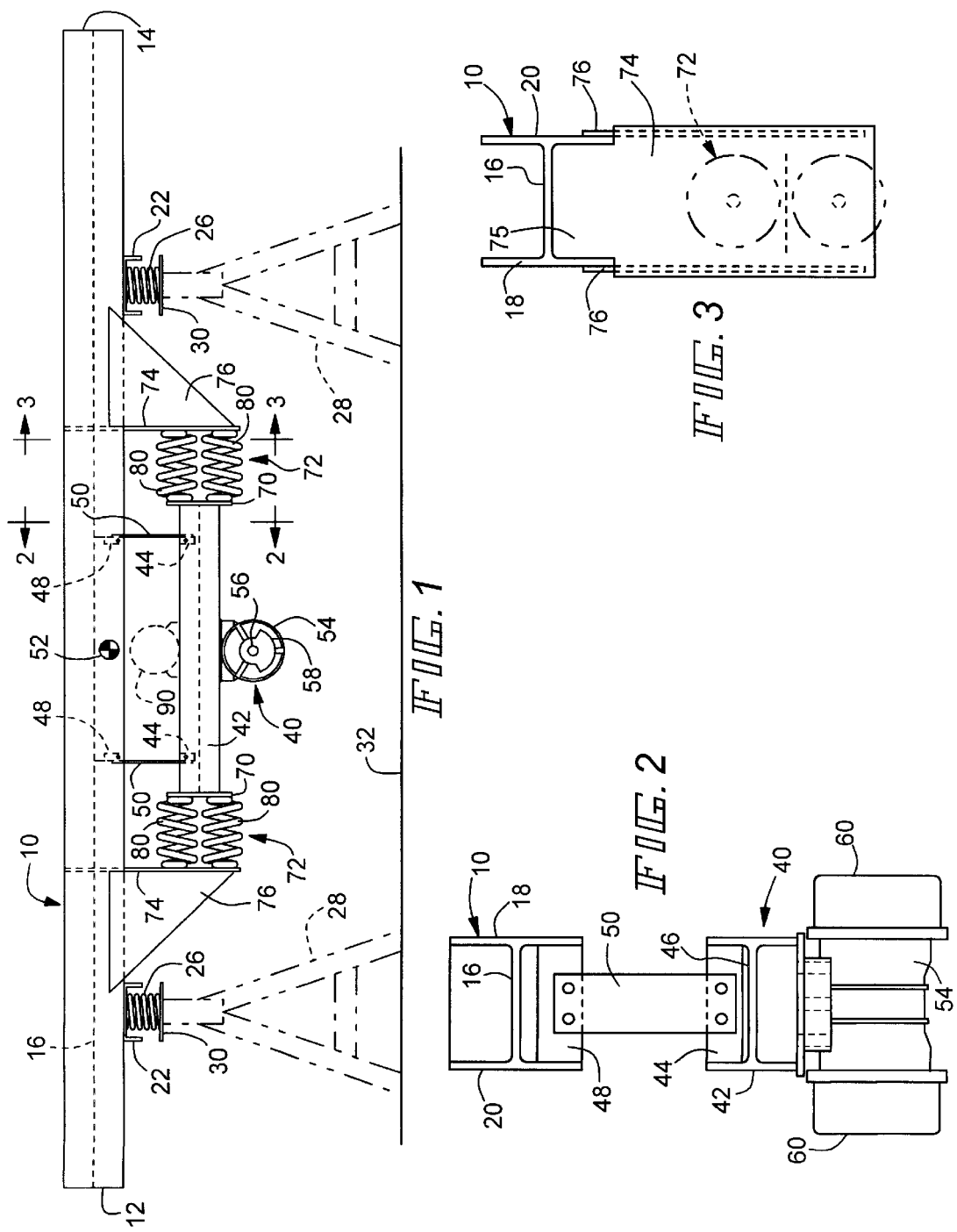

TWO WAY VIBRATORY CONVEYOR

FIELD OF THE INVENTION

This invention relates to vibratory conveyors that may feed objects in either of two directions.

BACKGROUND OF THE INVENTION

Two-way vibratory feeders or conveyors have substantial applications in a variety of fields. One typical application is in foundry operations. For example, castings may be delivered to the conveyor at a location intermediate its ends and then the conveyor energized to feed the castings to one end or the other depending upon where it is desired to locate the casting.

Conventional two-way conveyors will typically include an elongated bed with an upwardly facing, generally horizontal, elongated feeding surface. The bed will conventionally be supported on isolation springs adjacent to ends. Two vibration inducing assemblies, which typically will be electric motors with eccentric weights on their output shafts, are secured to the bed generally centrally thereof. Slats at approximately a 45 degree angle connect each of the motors to the bed, with the left most motor slats being canted approximately 45 degrees to the left and the right most motor slats being canted approximately 45 degrees toward the right, and angularly separated from the left most motor slats by approximately 90 degrees.

In operation, when the left most motor is energized, vibration resulting from eccentric revolution of the associated weight will cause material to be conveyed from right to left. When the other motor is energized, conveying will occur in the opposite direction.

In many applications, it will not be unusual that there is a considerable disparity between the amount of use of the left most motor and the right most motor. If one is energized to the substantial exclusion for the other, so called "false Brinnelling" of the motor bearings in the nonenergized system will occur as a result of the vibration imparted to the bed. Lubricant may be squeezed out of the bearings as a result and when the infrequently used system is finally energized, it may fail relatively quickly as a result of bearing failure due to the false Brinnelling and the resulting insufficient lubrication.

Moreover, in foundry applications, it will be necessary that the bed be formed of metal to stand up to the continued pounding of castings. In a prior art system such as described above, vertical acceleration of the conveying surface during operation will typically exceed that of gravity. As a result, after the surface has reached its highest point of movement in a cycle of vibration, it will then be accelerated downwardly more rapidly than a casting or the like that is being conveyed on the conveying surface. The casting will temporarily separate from the conveying surface but will eventually collide with the same as movement of the conveying surface is slowed and begins to reverse while the casting is being moved downwardly under the influence of gravity. The result is a noise producing impact of the casting upon the metal of which the conveying surfaces formed, and the level of the sound will typically be undesirably high.

Moreover, in such a device, the provision of two distinct vibration inducing systems where only one is used at any given time adds considerably to the cost of the apparatus.

To avoid certain of these difficulties, Schrader, in his U.S. Pat. No. 3,746,149 issued Jul. 17, 1973, and entitled "Reversible Vibratory Feeder," proposes a system whereby a single motor may be utilized to impart vibration to a conveying surface so that it may convey in either of two directions. To achieve conveying direction reversal, in addition to the usual isolation springs, the conveying surface of Schrader is mounted on a series of air springs and as illustrated, a minimum of eight such air springs are required, four at each end of the conveying surface.

At each end of the conveying surface, two of the air springs are opposed to one another at a 45 degree angle and the other two air springs are opposed to one another at 90 degrees to the first set. The opposed air springs of one pair are pressurized to the same degree by common plumbing connections and pressure regulators are employed to achieve the desired spring rate. Conveying in one direction or the other is achieved by tuning the system to resonance with the drive by adjustment of the pressure within the air springs to limit vibratory motion to a path that is inclined upwardly and to either the right or the left.

The difficulty with this system is in its complexity in terms of requiring a number of air springs and the need to achieve tuning and pressure regulation within the systems embodying the same. Moreover, the use of a significant number of air springs and their related plumbing adds considerably to the cost of the apparatus.

To avoid these and other problems, in the commonly assigned application of Albert Musschoot, Ser. No. 08/568, 018, filed Dec. 6, 1995 and entitled "Two-Way Vibratory Feeder or Conveyor," now U.S. Pat. No. 5,713,457, there is proposed a bidirectional conveying system wherein a single reversible electric motor is utilized to impart vibration to a conveying surface. The direction of conveying can be altered simply by reversing the direction of rotation of the electric motor.

In this particular device, which works well for its intended purpose, the vibration inducing system including the electric motor with eccentric weights on its output shaft, produces vibrations in sizable amplitudes in all directions. Dampers are utilized to eliminate most of the vertical vibratory force component applied to the conveying surface by the single, reversible vibration inducing system, while allowing the full amplitude of the horizonal component of such force to be applied to the bed to achieve the desired conveying effect. In this system, it is necessary that a relatively large motor be employed to achieve the desired amplitude. As the desired amplitude, at least in the vertical direction is absorbed as unnecessary to conveying and, in fact, must be absorbed in order to achieve conveying, it would seem as though a smaller motor could be used. However, when a smaller motor is employed, there is insufficient amplitude of vibratory forces in the horizonal direction to achieve the desired conveying rate. Thus, it is necessary to retain the relatively large motor, and that adds to the expense of the apparatus.

The present invention is directed to overcoming one or more of the above problems.

SUMMARY OF THE INVENTION

It is the principal object of the invention to provide a new and improved bidirectional conveyor. More specifically, it is an object of the invention to provide such a conveyor that includes a vibration inducing system of extremely simple construction and of relatively small size to minimize both cost and complexity of the conveyor.

An exemplary embodiment of the invention achieves the foregoing object in a bidirectional conveyor that includes a bed with an elongated, generally horizonal conveying surface with opposed ends. Isolation means are provided for mounting the bed above the underlying terrain and a vibration inducing assembly is connected to the bed. A horizontally active force amplification system interconnects the vibration inducing assembly and the bed.

As a consequence of the foregoing, a relatively small, reversible motor may be utilized to generate a relatively small magnitude vibratory force. The horizonal component of such force is amplified and applied to the bed by the amplification system. Thus, the desired amplitude in the horizonal direction is obtained in a simple, low cost system.

In a preferred embodiment, the force amplification system includes one or more generally horizontally acting, resilient elements. In a highly preferred embodiment, the resilient elements are springs.

In one embodiment, the springs are horizontally oriented coil springs.

In still another embodiment, the resilient means have a fixed spring rate.

In a highly preferred embodiment, a reversible motor defines a rotatable shaft and a reversible drive means for the vibration inducing system.

In one embodiment, slats are employed to mount the vibration inducing means to the bed.

In a preferred embodiment, a bidirectional vibratory conveyor is provided that includes an elongated, generally horizonal bed with opposed ends. Resilient isolation springs are connected to the bed and adapted to isolate the bed from the underlying terrain. An elongated vibration inducing assembly is in juxtaposition with the bed and is generally parallel thereto. The assembly includes a base mounting a reversible electric motor located generally medially of the bed with a rotatable output shaft generally transverse to the direction of elongation of the bed. The output shaft mounts an eccentric. Vertically disposed links mount the base to the bed and at least one horizontally oriented resilient mass is located at each end of the base and connected to the bed to sandwich the base and to serve as a vibration amplification system.

Other objects and advantages will become apparent from the following specification taken in connection with the accompanying drawings.

BRIEF DESCRIPTION OF THE DRAWINGS

FIG. 1 is a side elevation of a bidirectional vibratory conveyor made according to the invention;

FIG. 2 is an enlarged, fragmentary view taken approximately along the line 2—2 in FIG. 1; and FIG. 3 is an enlarged, fragmentary view taken approximately along the line 3—3 in FIG. 1.

DESCRIPTION OF THE PREFERRED EMBODIMENT

An exemplary embodiment of a bidirectional vibratory conveyor is illustrated in the drawings. While the same is described herein as a conveyor, that term is employed generically to include both feeders and conveyors.

The bidirectional vibratory conveyor of the invention includes an elongated bed, generally designated 10, having opposite ends 12 and 14. As seen in FIGS. 2 and 3, the bed 10 is in the form of an I beam turned on its side so that the upper surface 16 of the web serves as an elongated, horizontally oriented, conveying surface while the sides 18 and 20 of the I beam serve to confine the objects to be conveyed on the surface 16.

Downwardly opening cross channels 22 are located toward the ends 12 and 14 of the bed 10. They receive coil springs 26 in a conventional fashion which act as isolation springs for the bed 10. Legs or standards, shown in dotted lines at 28, may be provided with upper plates 30 to engage the lower ends of the springs 26 and support the bed 10 above the underlying terrain 32. Alternatively, those skilled in the art will appreciate that the bed 10 could be suspended by the isolation springs 26 from above.

Generally medially of the ends 12, 14, a vibration inducing assembly, generally designated 40, is secured to the underside of the bed 10. The vibration inducing assembly 40 includes an elongated base in the form of an I beam 42 turned on its side. Spaced cross members 44 extend parallel to the web 46 of the I beam 42 near the ends thereof while similar cross members 48 are located between the sides 18, 20 of the I beam defining the bed 10. Vertically oriented slats 50 interconnect to cross members 44 and 48 so as to mount the I beam 42 to the underside of the bed 10. The slats 50 serve as links and while they are shown as being rigidly connected to the cross members 44 and 48, vertically oriented links pivotally connected to both the bed 10 and the base 42 could be used in lieu thereof.

The center of gravity of the bed 10 is indicated at 52 and just below that location is mounted a reversible electric motor 54 having a rotatable output shaft 56. Two eccentrics 58 (only one of which is shown) are mounted on the shaft 56 on either side of the body of the motor 50. As seen in FIG. 2, a cover 60 houses the eccentrics 58 and the output shaft 56.

Typically, the motor 54 will be a reversible squirrel cage motor and will be a relatively small size in relation to those heretofore used. For example, the motor 54 need develop only about 20 percent or less of the horse power developed by the motor employed in the previously identified Musschoot patent.

The I beam 42 includes end plates 70 at each of its ends. Abutted against each of the end plates 70 is a vibratory force amplification system, generally designated 72. The bed includes force receiving plates 74 which have upper tongues 75 received between the sides 18 and 20 defining the I beam that makes up the bed 10. Triangular backing plates 76 provide reinforcement for the plates 74.

As seen in FIGS. 1 and 3, each of the force amplification systems 72 includes a pair of coil springs 80 located between and secured to a corresponding set of the plates 70 and 74 so as to sandwich the I beam 42 forming the base of the vibration inducing system. The coil springs 80 are horizontally oriented and thus form a horizontally acting force amplification system. It will be appreciated that each of the systems 72 may have but a single spring if desired. Alternatively, a plurality of more than the two springs illustrated may be utilized in some instances.

Significantly, the springs 80 are chosen to define a resonant frequency within the system that is just slightly greater than the rotational rate of the eccentrics 58. Thus, where the eccentrics 58 are mounted directly on the shaft 56 of the motor 54 which may, for example, have an output rotational rate of 900 RPM, the resonant frequency of the system may be chosen to be, for example, 960 cycles per minute. If desired, a greater disparity between the two frequencies can be tolerated where a lesser amplification is required of the system 72. Alternatively, the resident frequency of the system may be brought closer to the rotational rate of the eccentrics 58 if desired, but that may raise the possibility of an unexpected loss in amplification for certain loadings of the surface 16.

It is desired that the motor 54 be vertically aligned with the center of gravity 52 although that is not necessary in every case. While the motor 54 is shown in the drawings as being suspended from the underside of the base 42, a preferred location for the motor 54 is shown in dotted lines at 90 as being located on the upper side of the base 42 and just below the bed 10.

In operation, the vertical vibratory component required for conveying is relatively small because of the relatively small size of the motor 54. It is transmitted to the bed 10 via the slats 50.

At the same time, while the horizonal vibratory component applied to the base 42 by the motor 54 is of a similar magnitude, by the time it is applied to the bed 10 it is amplified by the vibration amplification systems 72 so that the horizonal component of the vibratory force greatly exceeds the vertical component to provide the desired conveying rate. The result is that the bed 10 moves in the pattern of a very narrow or flattened ellipse.

To reverse the conveyor direction, one need only reverse the direction of rotation of the motor 54. The same narrow elliptical pattern is followed but in the opposite direction.

As noted previously, the bidirectional vibratory conveyor of the present invention achieves a comparable conveying rate to that in the previously identified Musschoot patent with a motor of only 20 percent or less of the size acquired by the conveyor of the previously identified Musschoot patent. As a consequence, a substantial cost saving in the motor is achieved. And, of course, because a smaller motor is used, energy costs are reduced to provide a continuing saving to the user of the conveyor.

The present invention retains a simple construction and in fact even eliminates the vertical force absorbers utilized in the previously identified Musschoot patent. Thus simplicity remains in a conveyor made according to the invention.

What is claimed is:

1. A bidirectional vibratory conveyor comprising:

an elongated, generally horizontal bed with opposite ends;

resilient isolation springs connected to said bed and adapted to isolate said bed from an underlying terrain;

an elongated vibration inducing assembly in juxtaposition with said bed and generally parallel thereto, said assembly including a base mounting a reversible electric motor located generally medially of said bed, with a rotatable output shaft generally transverse to a direction of elongation of said bed and mounting an eccentric;

vertically disposed links mounting said base to said bed; and at least one horizontal oriented resilient mass at each end of said base and connected to said bed to sandwich said base.

2. The bidirectional vibratory conveyor of claim 1 wherein at least one of said resilient masses comprises a horizontally oriented coil spring.

3. The bidirectional vibratory conveyor of claim 1 wherein at least one of said links comprises a vertically disposed slat.

4. A bidirectional vibratory conveyor comprising:

an elongated, generally horizontal bed with opposite ends;

resilient isolation springs connected to said bed and adapted to isolate said bed from an underlying terrain;

an elongated vibration inducing assembly in juxtaposition with said bed and generally parallel thereto, said assembly including a base mounting a reversible electric motor located generally medially of said bed, with a rotatable output shaft generally transverse to a direction of elongation of said bed and mounting an eccentric;

vertically disposed links mounting said base to said bed; and a horizontally oriented resilient mass interconnecting said bed and said base.

5. The bidirectional vibratory conveyor of claim 4 wherein there are at least two of said resilient masses, one on each side of said motor.

6. The bidirectional vibratory conveyor of claim 4 wherein said resilient mass is a generally horizontally directed coil spring.

7. A bidirectional vibratory conveyor comprising:

an elongated, generally horizontal bed with opposite ends;

resilient isolation springs connected to said bed and adapted to isolate said bed from an underlying terrain;

an elongated vibration inducing assembly in juxtaposition with said bed and generally parallel thereto, said assembly including a base mounting a reversible electric motor located generally medially of said bed, with a rotatable output shaft generally transverse to a direction of elongation of said bed and mounting an eccentric;

vertically disposed links mounting said base to said bed; and a horizontally active force amplification system interconnecting said base and said bed.

\* \* \* \* \*